May 5, 1970 C. W. DAVID ET AL 3,509,992

DISC PACK ENCLOSURE

Filed June 6, 1966 3 Sheets-Sheet 1

INVENTORS:
CHARLES W. DAVID
RAYMOND STUART-WILLIAMS
By Smyth, Roston & Pavitt
ATTORNEYS

DISC PACK ENCLOSURE

Filed June 6, 1966

INVENTORS:
CHARLES W. DAVID
RAYMOND STUART-WILLIAMS

By Smyth, Roston & Pavitt
ATTORNEYS

May 5, 1970 C. W. DAVID ET AL 3,509,992

DISC PACK ENCLOSURE

Filed June 6, 1966 3 Sheets-Sheet 3

INVENTORS:
CHARLES W. DAVID
RAYMOND STUART-WILLIAMS

By Smyth, Roston & Pavitt
ATTORNEYS

United States Patent Office 3,509,992

Patented May 5, 1970

3,509,992

DISC PACK ENCLOSURE

Charles W. David, Marina Del Rey, and Raymond Stuart-Williams, Pacific Palisades, Calif., assignors, by mesne assignments, to Disc Pack Corporation, a corporation of California Filed June 6, 1966, Ser. No. 555,476

Int. Cl. G11b *1/02, 25/04;* B65d *21/02*

U.S. Cl. 206—62 6 Claims

ABSTRACT OF THE DISCLOSURE

This disclosure describes an enclosure including upper and lower container sections with the lower container section having a recess therein and the upper container section having a projection sized to nest within the lower container section. The recess has an end wall and a recessed nesting surface lying intermediate the outer edge thereof and the end wall. The container sections are interconnected by a mechanism which includes a knob positioned within the recess. When containers of this type are stacked in nesting relationship, the recess provides ample space for the knob and/or the container handle to thereby preclude these members from interfering with the stacking of the containers.

This invention relates to a disc pack enclosure for recording discs of the type used in data processing machines.

As is well known, such discs are annular metal members which are provided with a thin oxide coating. It is conventional practice to stack these discs in spaced parallel relationship within a dust-tight disc pack enclosure. The discs are mounted on a member within the enclosure to permit rotation thereof by a drive means on a data processing unit.

It is often necessary to have several hundred of the disc pack enclosures in a computer room at one time. Prior art disc pack enclosures require a large amount of storage space within or adjacent the computer room. The conventional disc pack enclosures may be scattered randomly throughout the room or stored on desks or tables. This arrangement makes it somewhat difficult to locate a particular disc pack enclosure, requires a large storage space, and is also quite unsightly. Alternatively, shelves may be used to store the disc pack enclosures, but these, too, take up considerable space and add to the cost of building construction or furnishing.

Because of the nature of the recording discs, it is imperative that they be kept very clean and dust-free while they are within the disc pack enclosure. Only a small amount of dust or other contaminants may make the disc useless for its intended purpose. It is very important, therefore, that the disc pack enclosure provide a dust-tight container for the discs.

Another difficulty with prior art disc pack enclosures is that the plastic covers are subject to cracking and even breaking. When this happens, the discs therein may become contaminated by the dust or other matter which may be allowed to pass through the crack or opening. Furthermore, the scratches or cracks are unsightly and not suited to the decor of the modern computer room.

The present invention overcomes these problems by providing disc pack enclosures which can be stacked in nesting relationship. Thus, the present invention reduces to a minimum the amount of storage space required for the disc pack enclosures while providing an orderly method of storage. Bulky and expensive shelves are not required and a large amount of floor or desk space is no longer needed. The present invention also provides reinforcing ribs on the disc pack enclosure which strengthen the enclosure to prevent scratching, cracking, or breaking thereof. Thus, the reinforced enclosure assures that the discs will not be contaminated through cracking or breaking of the disc pack enclosure. The reinforced disc pack enclosure is sufficiently strong to support the weight of many similar enclosures which may be stacked thereon.

The disc pack enclosure of the present invention includes a container forming a substantially imperforate enclosure, a disc pack within the container, and means within the container for mounting the disc pack for rotation. To permit stacking of several of the disc pack enclosures, the lower wall of the container has a recess therein defining a recessed nesting surface and the upper wall of the container has a projection defining a projecting nesting surface which is sized to nest within and snugly engage the recessed nesting surface. Thus, the nesting surfaces of adjacent containers cooperate to allow stacking of many of the disc pack enclosures in nested relationship.

The container is constructed of molded plastic material. To prevent cracking or breaking of the container, a plurality of radially extending reinforcing ribs are molded integrally with the container. The containers are thereby made sufficiently strong to resist cracking and breaking and to allow the lowermost of a stack of containers to support the weight of the disc pack enclosures thereabove.

More particularly, the container includes upper and lower members or sections which are secured together to form a dust-tight enclosure. The lower member is held on the disc pack by means including a knob which is disposed in the recess and extends through the lower wall to the container. The recess is provided with a downwardly facing annular shoulder between the peripheral edge or mouth of the recess and the end wall of the recess. The annular shoulder of the recess rests on the projection of the next lower container. The knob is positionable within the recess above or substantially flush with the plane of the annular shoulder so that the knob will not interfere with the nesting of adjacent containers.

The recess has a frustoconical guiding portion intermediate the peripheral edge thereof and the annular shoulder, and the projection has a frustoconical guiding portion sized to mate with the frustoconical guiding portion of the recess. These guiding portions rapidly guide the recess of an upper container into nesting relationship with the projection of the container therebelow. Thus, rapid stacking of the containers in nesting relationship is possible.

To facilitate transportation and handling of the disc pack enclosures, it is necessary or desirable that each of them be provided with a handle. Because the disc pack enclosures of this invention are to be stacked together in nesting relationship, the conventional handle which protrudes upwardly a substantial distance beyond the upper wall of the container cannot be used. Accordingly, the disc pack enclosure of the present invention is provided with an annular projection on the upper wall thereof and a handle secured to the annular projection and extending thereacross substantially flush with such annular projection. Thus, the handle does not interfere with the nesting of the containers. The handle preferably extends diametrically across the annular projection and is spaced along a substantial portion of its length from the annular projection to allow it to be grasped by the hand of the user. Of course, the upper wall of the container should provide a recess below the handle to accommodate a portion of the hand of the user.

The knob serves to threadedly connect the lower section of the container to the remainder of the disc pack enclosure. Another difficulty with prior art disc pack enclosures is that frequently the knob will be turned until the threads are stripped. To obviate this problem, the knob on the disc pack enclosure of this invention has a smooth lateral gripping surface in lieu of the conventional serrated gripping surface. This makes it more difficult for the user to apply an excessively high torque to the knob. To make it still more difficult to apply an excessively high torque to the knob, the lateral gripping surface, which is preferably generally cylindrical, is spaced only slightly from a lateral wall of the recess. This slight spacing is large enough to allow insertion of the fingertips of the user therein, but precludes insertion of the entire hand or a substantial portion thereof. Thus, the user can only grip the knob with his fingertips and is thereby prevented from applying maximum torque to the knob.

The disc pack enclosure as described hereinabove is suitable for use with various internal disc pack constructions. One preferred construction includes a hollow mounting member which is telescoped over the portion of the knob which lies within the container and which is utilized to support the discs. Annular spacers maintain the discs in spaced parallel relationship. When the knob is removed from the container, the interior of the hollow mounting member may be placed over a drive spindle of a data processing machine which will rotate the member and the discs supported thereby.

The upper member or cover of the container is retained on the remainder of the disc pack enclosure by a detent. The detent is releasable in response to securing the disc pack enclosure to the drive means of the data processing unit. When the disc pack enclosure is secured to the drive means, the detent is automatically released to allow removal of the cover. Thus, it is impossible to remove the cover prior to the time that the disc pack enclosure is secured to the drive means.

The invention, both as to its organization and method of operation, together with further features and advantages thereof, may best be understood by reference to the following description taken in connection with the accompanying drawings in which.

Figure 1:
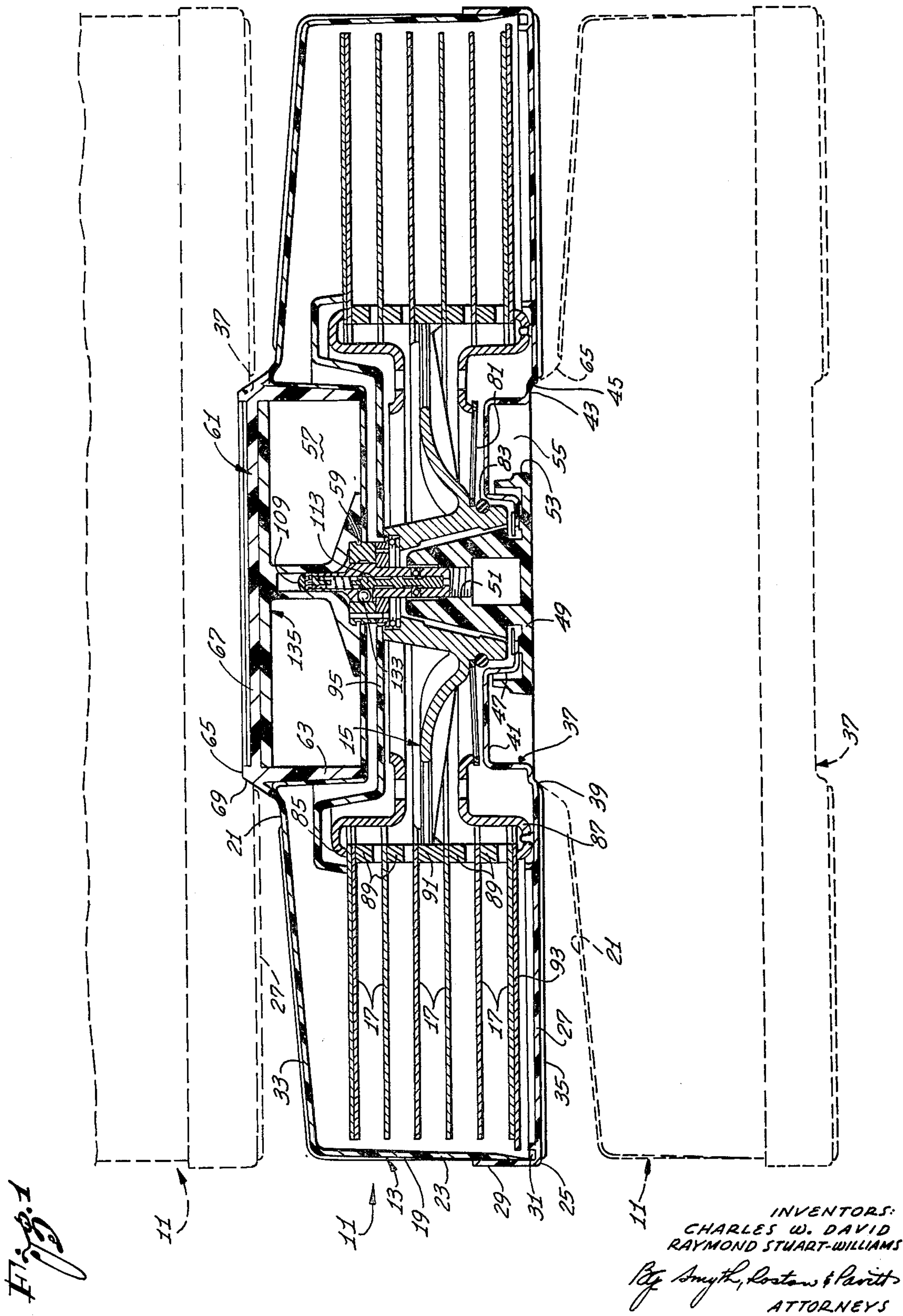
FIG. 1 is a fragmentary elevational view of a stack of disc pack enclosures constructed in accordance with the teachings of this invention with the intermediate enclosure being illustrated in section.

Referring to the drawings, reference numeral 11 designates a disc pack enclosure which generally includes a generally cylindrical container 13 and a hollow driven mounting member 15 mounted within the container. A plurality of annular oxide-coated recording discs 17 are mounted in spaced parallel relationship within the container 13 for rotation with the mounting member 15.

The container 13 includes an upper section or cover 19 having a generally circular sloping upper wall 21 and an integral generally cylindrical lateral wall 23 and a lower section 25 forming a lower wall 27 and an upwardly extending annular flange 29. The lateral wall 23 telescopes within the annular flange 29 and engages an annular seal 31 to form a substantially imperforate dust-tight enclosure.

The container 13 is constructed of molded plastic material. The cover 19 has a plurality of radially extending integral reinforcing ribs 33 which extend along the upper wall 21 and down the lateral wall 23 and terminate closely adjacent the upper edge of the flange 29. The lower section 25 is similarly reinforced by a plurality of radially extending reinforcing ribs 35 molded integrally with the lower wall 27.

Figure 2:
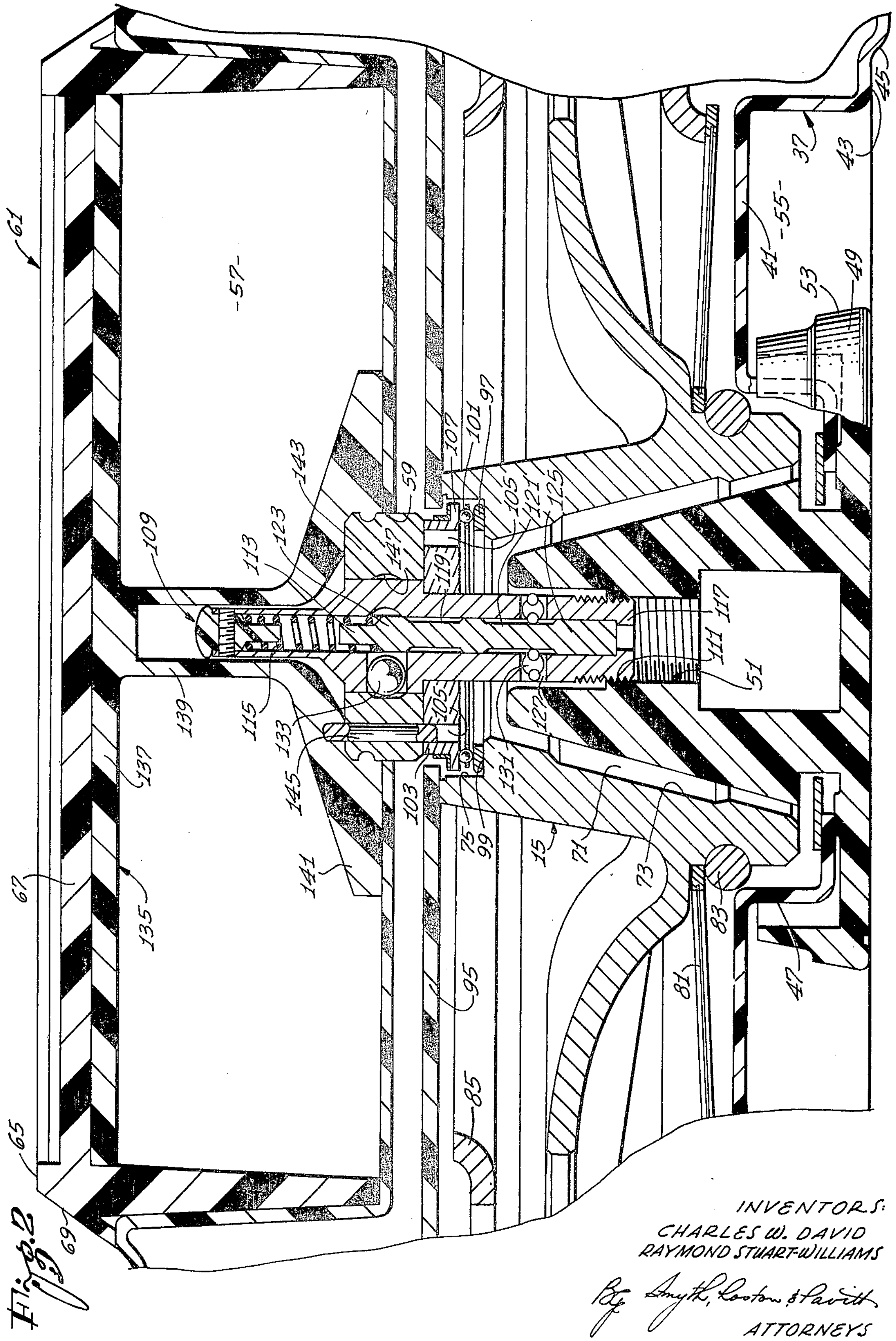
FIG. 2 is an enlarged fragmentary sectional view of one of the disc pack enclosures.

With reference to FIGS. 1 and 2, the lower wall 27 forms a generally cylindrical axial recess 37 which extends inwardly from a lower peripheral edge or mouth 39 and terminates in an end wall 41. A flat generally downwardly directed annular shoulder 43 is formed intermediate the peripheral edge 39 and the end wall 41. A frustoconical guiding surface 45 extends upwardly and inwardly from the peripheral edge 39 and terminates in the annular shoulder 43. The shoulder 43 and the guiding surface 45 form a nesting surface of the recess 37.

The recess 37 has a centrally positioned apertured boss 47 extending downwardly from the end wall 41. A knob 49 is disposed in the recess 37 and has an internally threaded tubular portion 51 extending through the apertured boss 47. As explained hereinbelow, the knob 49 and the lower section 25 must be removed in order to remove the cover 19.

As shown in FIGS. 1 and 2, the knob 49 is positionable substantially flush with or above the plane of the annular shoulder 43. The knob 49 has a smooth lateral generally cylindrical gripping surface 53 which is spaced from the lateral wall of the recess 37 to provide an annular finger space 55. The finger space 55 is sufficiently wide to permit insertion of the fingertips of the user, but sufficiently narrow to preclude insertion of a substantial portion of the fingers or hand.

Figure 3:
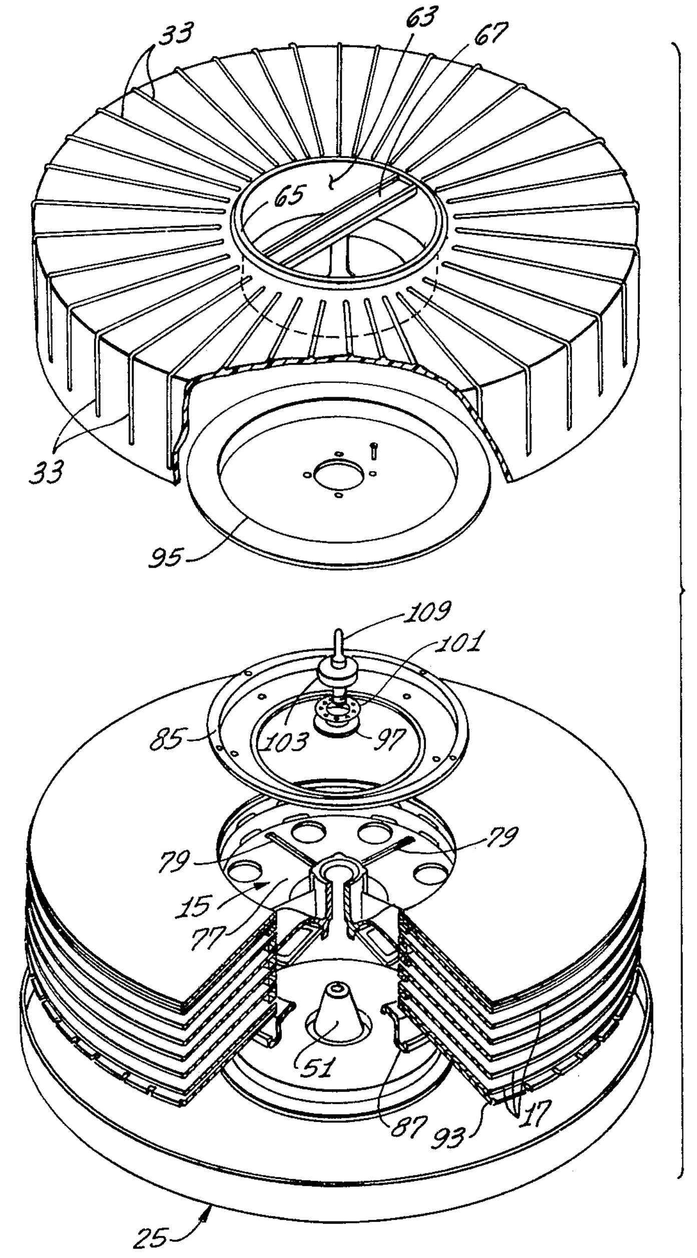
FIG. 3 is an exploded perspective view of one of the disc pack enclosures.

As best seen in FIGS. 1 and 2, the upper wall 21 forms a generally cylindrical axial cavity 57 having a central aperture 59 leading to the interior of the container 13. The cover 19 has a handle unit 61, which includes a skirt portion 63, an annular projection 65 and a handle 67 extending across the annular projection substantially flush therewith is secured to the wall 21 within the cavity 57. As shown in FIG. 3, the longitudinal sides of the handle 67 are spaced from the wall of the skirt portion 63 to form a space through which the fingers of the user may pass into the cavity 57. The handle unit 61 includes a frustoconical guiding surface 69 which tapers downwardly and outwardly from the uppermost surface of the annular projection 65. The projection 65 and the guiding surface 69 form a nesting surface for the projection and such nesting surface is nestable within and snugly engageable with the nesting surface of the recess of the container immediately thereabove.

More particularly, the annular shoulder 43 of one of the containers 13 rests upon the annular projection 65 of the container therebelow. The guiding surfaces 45 and 69 of these two containers are in engagement or in very close proximity. The guiding surfaces 45 and 69 provide for quick and efficient stacking of adjacent containers. As the knob 49 is positioned above or flush with the annular shoulder 43, it does not interfere with the stacking of the containers. Likewise, the handle 67 is substantially flush with the projection 65 and does not interfere with the nesting relationship of the containers.

Various internal constructions for the disc pack enclosure 11 may be provided. Several methods for mounting a disc pack for rotation within a disc pack enclosure are known, the one illustrated herein being a preferred design. The driven mounting member 15 has a central bore 71 which defines a frusto-conical driving surface 73 and a counterbore 75. The mounting member 15 also has an outwardly extending generally circular portion 77 (FIG. 1) and several radially extending webs 79.

An annular nylon filter 81 is clamped between a sealing ring 83 and the mounting member 15. The discs 17 are held within the container 13 by upper and lower annular retaining clamps 85 and 87, respectively. A spacer ring 89 is positioned between adjacent pairs of the discs 17 with a central spacer ring 91 being integral with the mounting member 15. The column of discs is further supported by a lower annular plate 93 which rests on the lower clamp 87. The upper and lower clamps 85 and 87 may be bolted or otherwise secured together to hold the rings 89 and 91 and the discs 17 together, the latter being held in spaced parallel relationship. The discs 17 are drivingly connected to the mounting member 15 by the ring 91 which is integral with the latter and which is clamped between a pair of adjacent discs 17. An apertured cover plate 95 is suitably secured to the mounting member 15 as by a plurality of screws (not shown).

A washer 97 (FIG. 2) is supported on an annular shoulder 99 in the counterbore 75 and a bearing 101 rests on the washer 97. A plate 103 having a plurality of holes 105 therein is supported by the bearing 101 and is prevented from moving upwardly out of the counterbore 75 by the cover plate 95 which is engageable with an annular flange 107 integral with the plate. A tube 109 is secured to the plate 103 and extends axially in both directions therefrom. The tube 109 has an externally threaded lower portion 111 which is received in the internally threaded tubular portion 51 of the mounting member 15. A locking pin 113 is biased downwardly within the tube 109 by a spring 115 into engagement with a stop 117 which is integral with the tube. The pin 113 has reduced diameter sections 119 and 121 and enlarged shoulders 123 and 125. The tube 109 has a plurality of lower radial passageways 127 and an upper radially extending passageway 129, each of the former carrying a detent ball 131 and the latter carrying a detent ball 133.

A handle support unit 135 is provided partially within the cavity 57 and partially within the container 13. The unit 135 has an upper support 137 substantially coextensive with the handle 67, a hollow downwardly opening stem 139 receiving the upper end portion of the tube 109, a flange 141 to which a ring member 143 is secured, and a plurality of pins 145 secured to the flange 141 and extending downwardly through the ring member 143 and terminating in the holes 105 of the plate 103. An annular internal groove 147 is formed in the ring member 143.

With the disc pack enclosure in the position shown in FIGS. 1 and 2, the tubular portion 51 threadedly engages the lower threaded portion 111 of the tube 109. The detent balls 131 are retained within the lower passageways 127 by the tubular portion 51 and are engageable with the shoulder 125 to prevent substantial upward movement of the locking pin 113. The detent ball 133 is maintained within the internal annular groove 147 of the ring member 143 by the shoulder 123. Thus, the cover 19 is firmly retained on the lower section 25 of the container 13 and a plurality of the containers 13 may be stacked in nesting relationship, as illustrated in FIG. 1.

When one of the disc pack enclosures 11 is to be utilized with a data processing unit, the knob 49 is removed with the lower section 25 to expose the driving surfaces 73. Even though the knob 49 is removed, the cover 19 is firmly retained against the disc pack by the detent ball 133 and the groove 147. When the driving surface 73 of the disc pack enclosure is placed over a driving spindle (not shown) of a data processing unit and is secured thereto, an upwardly extending projection on such spindle will urge the locking pin 113 upwardly and force the detent balls 131 outwardly in their respective passageways. When the locking pin 113 has been pushed upwardly a sufficient distance, the reduced diameter portion 119 will be adjacent the detent ball 133. The ball 133 is then movable radially inwardly to allow removal of the cover 19 and the handle support unit 135. The drive spindle may then be utilized to rotate the mounting member 15 and the discs 17.

Although an exemplary embodiment of the invention has been shown and described, many changes, modifications, and substitutions may be made by one having ordinary skill in the art without necessarily departing from the spirit and scope of this invention.

What is claimed is:

1. A disc pack enclosure comprising:

a container forming a substantially imperforate enclosure;

a disc pack within said container;

means for mounting said disc pack within said container;

said container including upper and lower container sections having, respectively, upper and lower container walls;

said lower wall defining a central recess having a peripheral edge, said recess extending upwardly from said peripheral edge to terminate in an end wall, said lower wall defining a recessed nesting surface within said recess;

said upper wall defining a centrally upwardly extending projection having a projecting nesting surface sized to nest within and engage said recessed nesting surface;

means for interconnecting said upper and lower container sections, said interconnecting means including a movable member positioned at least partially within said recess and means responsive to movement of said movable member to permit separation of said container sections; and said recessed nesting surface lying below said end wall and being engageable with the projecting nesting surface of an enclosure therebelow to thereby provide a space between the recessed nesting surface and the end wall for the movable member even when the first mentioned enclosure is stacked in nesting relationship with the second mentioned enclosure.

2. An enclosure as defined in claim 1 wherein said movable member lies entirely within said space.

3. An enclosure as defined in claim 1 wherein said projection includes an annular portion sized to be at least partially receivable within said recess, said enclosure including a handle extending at least partially across said annular portion, said handle being sufficiently low so as not to contact the movable member of an enclosure immediately thereabove in a manner which would interfere with the engagement of the nesting surfaces of the first mentioned and third mentioned enclosures.

4. An enclosure as defined in claim 3 wherein said handle is joined to said annular portion and extends completely thereacross with sufficient clearance between the handle and said annular portion laterally of the handle to provide access thereto.

5. An enclosure as defined in claim 4 wherein said recessed nesting surface includes a generally downwardly directed annular shoulder intermediate said peripheral edge and said end wall of the recess and a frustoconical guiding portion intermediate said peripheral edge and said annular shoulder.

6. An enclosure comprising:

a container including upper and lower container sections having upper and lower container walls, respectively;

said lower wall defining a central recess having a peripheral edge, said recess extending upwardly from the peripheral edge to terminate in an end wall, said lower wall defining a recessed nesting surface within said recess;

said upper wall defining a central upwardly extending projection having a projecting nesting surface sized to nest within said recessed nesting surface;

said projection including a circumscribing portion sized to be at least partially received within said recess;

a handle extending at least partially across said circumscribing portion with sufficient clearance between the handle and the circumscribing portion laterally of the handle to provide access thereto;

means for interconnecting said upper and lower container sections, said interconnecting means including a movable member positioned at least partially within said recess and means responsive to movement of said movable member to permit separation of said container sections; and means including at least one of said recess and said upper wall within said circumscribing portion for providing space for said handle and said movable member when said enclosure is stacked in nesting relationship with a similar enclosure.

References Cited

UNITED STATES PATENTS

| | | | |
|---|---|---|---|
| 2,834,507 | 5/1958 | Metzler | 220—97 |
| 2,913,140 | 11/1959 | Vuillemenot | 220—97 |
| 3,084,791 | 4/1963 | Hawley | 220—72 |
| 3,176,281 | 3/1965 | Pattison | 340—174.1 |
| 3,206,214 | 9/1965 | Leary | 340—174.1 |

BERNARD KONICK, Primary Examiner

G. M. HOFFMAN, Assistant Examiner

U.S. Cl. X.R.

206—52, 65; 220—97, 72; 346—137; 340—174.1